United States Patent [19]
Mitchell

[11] Patent Number: 5,974,365
[45] Date of Patent: Oct. 26, 1999

[54] SYSTEM FOR MEASURING THE LOCATION AND ORIENTATION OF AN OBJECT

[75] Inventor: Robert R. Mitchell, Madison County, Ala.

[73] Assignee: The United States of America as represented by the Secretary of the Army, Washington, D.C.

[21] Appl. No.: 08/956,597

[22] Filed: Oct. 23, 1997

[51] Int. Cl.[6] .............................. G01C 9/06; G06F 15/00
[52] U.S. Cl. ........................... 702/150; 702/94; 348/95; 356/139.04; 356/400; 250/139.05
[58] Field of Search ....................... 702/94.95, 150–153; 395/89, 138; 348/870.31, 95; 250/548, 201.3, 201.7, 202, 550–553, 559.29–559.3; 378/69; 356/400, 326, 139.04, 139.05–139.06

[56] References Cited

U.S. PATENT DOCUMENTS

| | | | |
|---|---|---|---|
| 4,810,091 | 3/1989 | Sullivan | 356/326 |
| 4,845,373 | 7/1989 | Jamison | 356/408 |
| 4,891,829 | 1/1990 | Deckman | 378/4 |

*Primary Examiner*—Kamini Shah
*Attorney, Agent, or Firm*—Hugh P. Nicholson; Freddie M. Bush; Hay Kyung Chang

[57] ABSTRACT

The purpose of a system for measuring the location and orientation of an object is to align one object with another by simultaneously measuring the six degrees of freedom of the objects. The system accomplishes the purpose by employing a linear optical detector array sensor on the first object and a pre-selected target pattern on a second object to measure the six degrees of freedom and converting them to six position measurement via a microprocessor which has suitable algorithms residing in it. The six position measurements (azimuth, elevation, range, pitch, yaw and roll) are displayed for viewing by the operator who, then, manipulates the objects until pre-determined desired values of the six position measurements are obtained, indicating a complete alignment between the objects.

7 Claims, 9 Drawing Sheets

SYSTEM FOR MEASURING THE LOCATION AND ORIENTATION OF AN OBJECT

DEDICATORY CLAUSE

The invention described herein may be manufactured, used and licensed by or for the Government for governmental purposes without the payment to me of any royalties thereon.

BACKGROUND OF THE INVENTION

There are tasks, such as assembly, which, for their successful completion, require position measurement and alignment of one object relative to another object. An example is the alignment of two space crafts for docking. Current alignment methods consist of various combinations of visual and telescopic sighting approaches and special purpose sensors which measure only some of the six degrees of freedom (DOF) of relative motion. Using these methods, therefore, the operator has to sequence laboriously through several steps with various devices, each of the devices providing only part of the required information. In addition, considerable training and skill is necessary to use these methods because, as vision-based methods, they depend heavily on the operator's human judgment. It is possible to measure all six degrees of freedom (azimuth, elevation, range, pitch, yaw and roll) using a video camera with a special target but the cost of the sensor and the complex electronic processing required to convert the video image into position data is high.

SUMMARY OF THE INVENTION

Applicant's invention allows the automatic measurement and simultaneous display of all six degrees of location and orientation of an object relative to another object. This is accomplished by a simple optical sensor, comprised of a linear detector array and a lens, mounted on the first object and a pre-selected alignment pattern affixed to the second object. The field-of-view of the sensor contains within it the alignment pattern and signals are produced that are indicative of the measured six degrees of freedom. The signals are, then, processed by a processor which has residing therein appropriate algorithms and displayed on a display unit for viewing by the human operator who manipulates the first object in relation to the second object until pre-determined desired values of the six DOF are obtained, indicating that the desired alignment of the two objects has been accomplished.

DESCRIPTION OF THE PREFERRED EMBODIMENT

Figure 1:
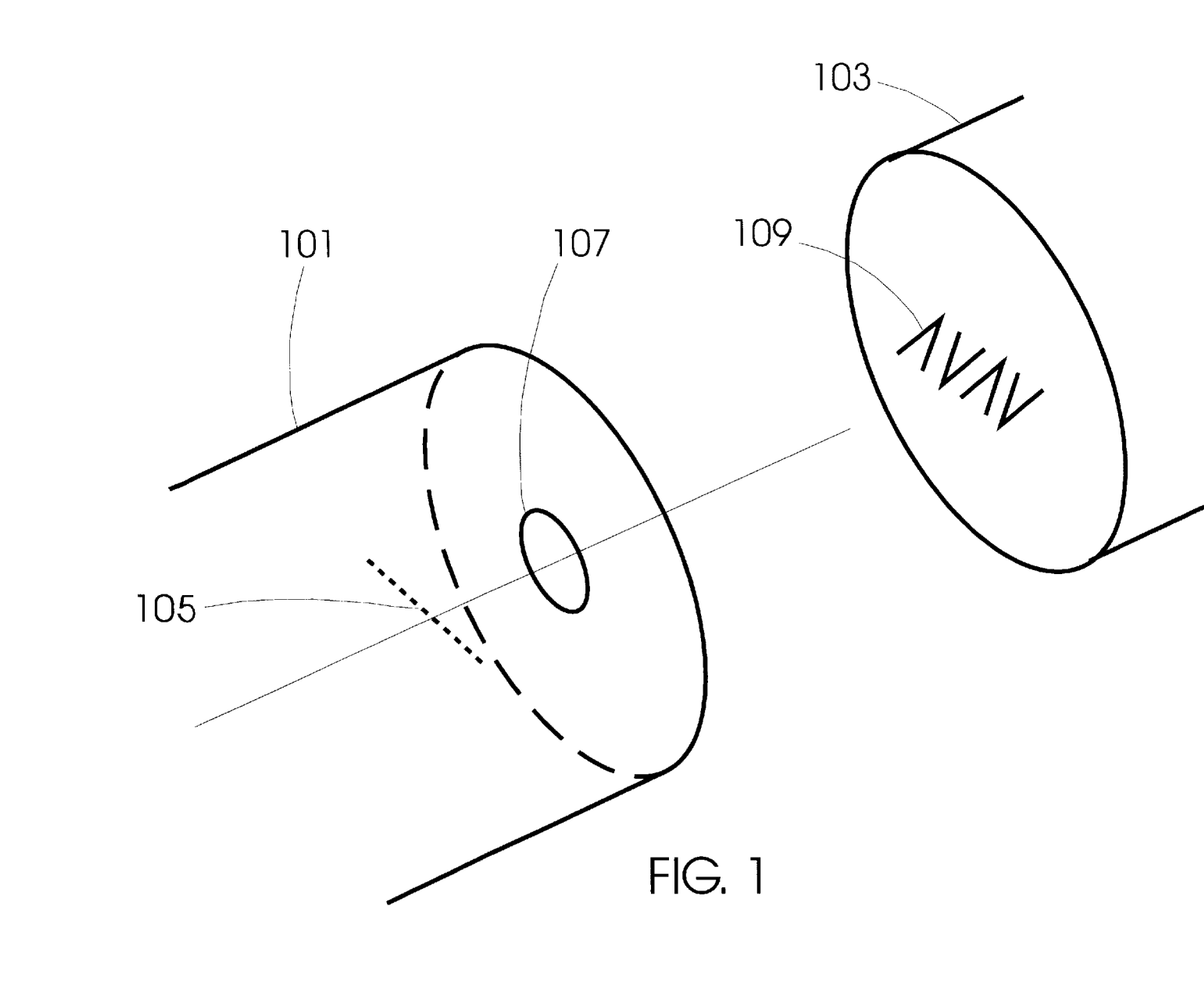
FIG. 1 is an over-all illustration of the operation of the system for measuring the location and orientation of an object.
Figure 3:
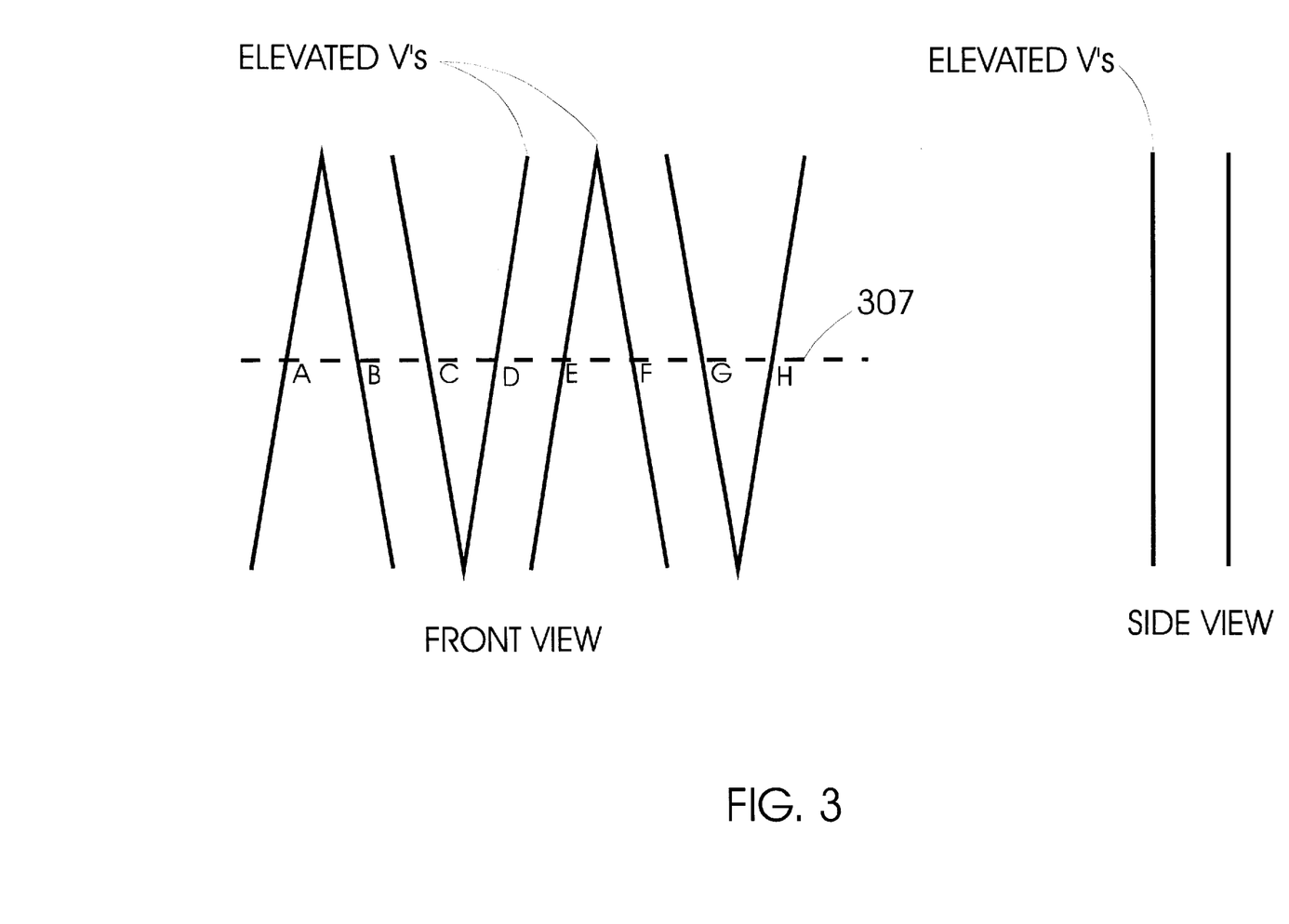
FIG. 3 illustrates the configuration of the pattern, showing the two inner v-shaped elements as being elevated from the surface plane of the second object.
Figure 4:
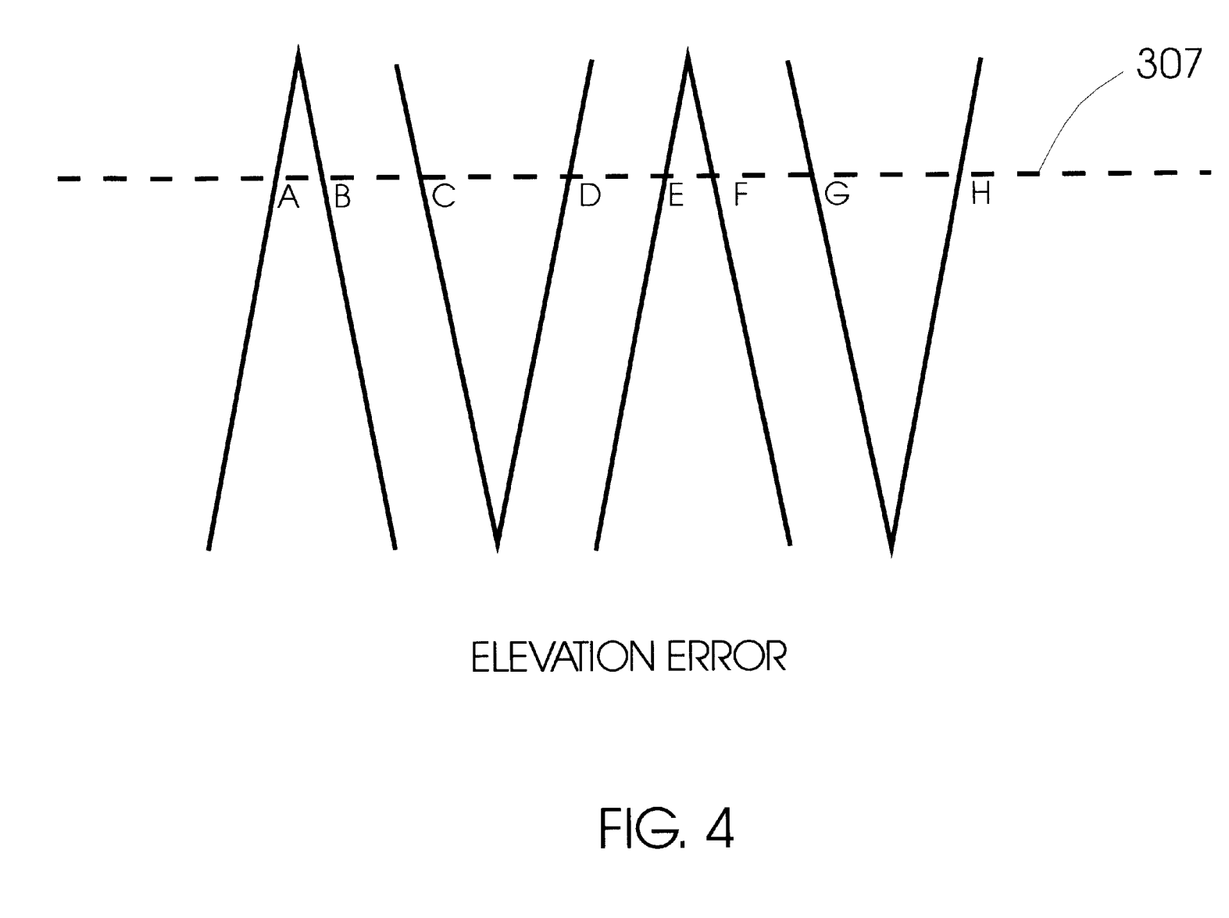
FIG. 4 shows how the v-shaped elements of the pattern line up with respect to the detector image when there is an elevation error in the alignment of the two objects.
Figure 5:
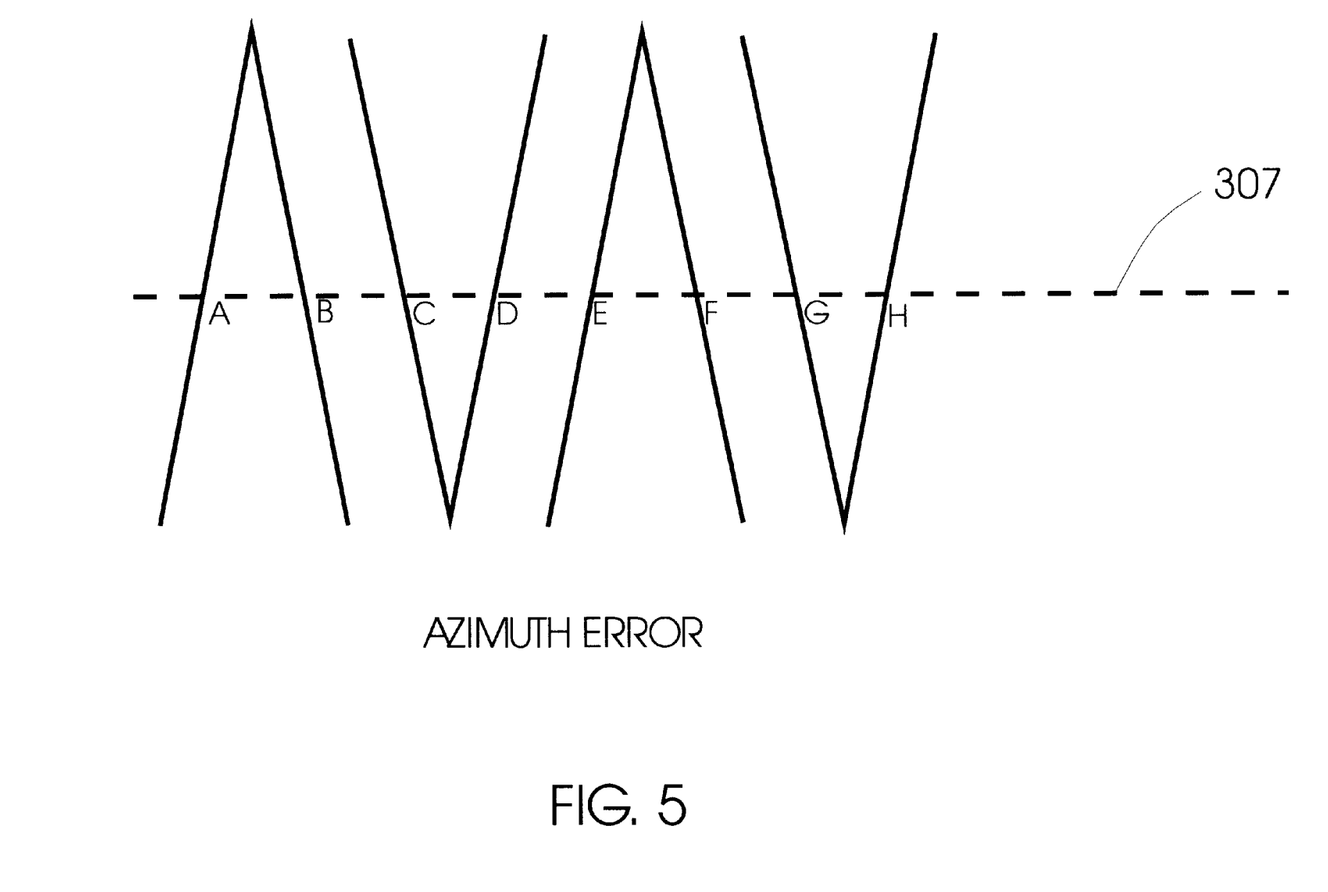
FIG. 5 illustrates azimuth error in the alignment of the two objects.
Figure 6:
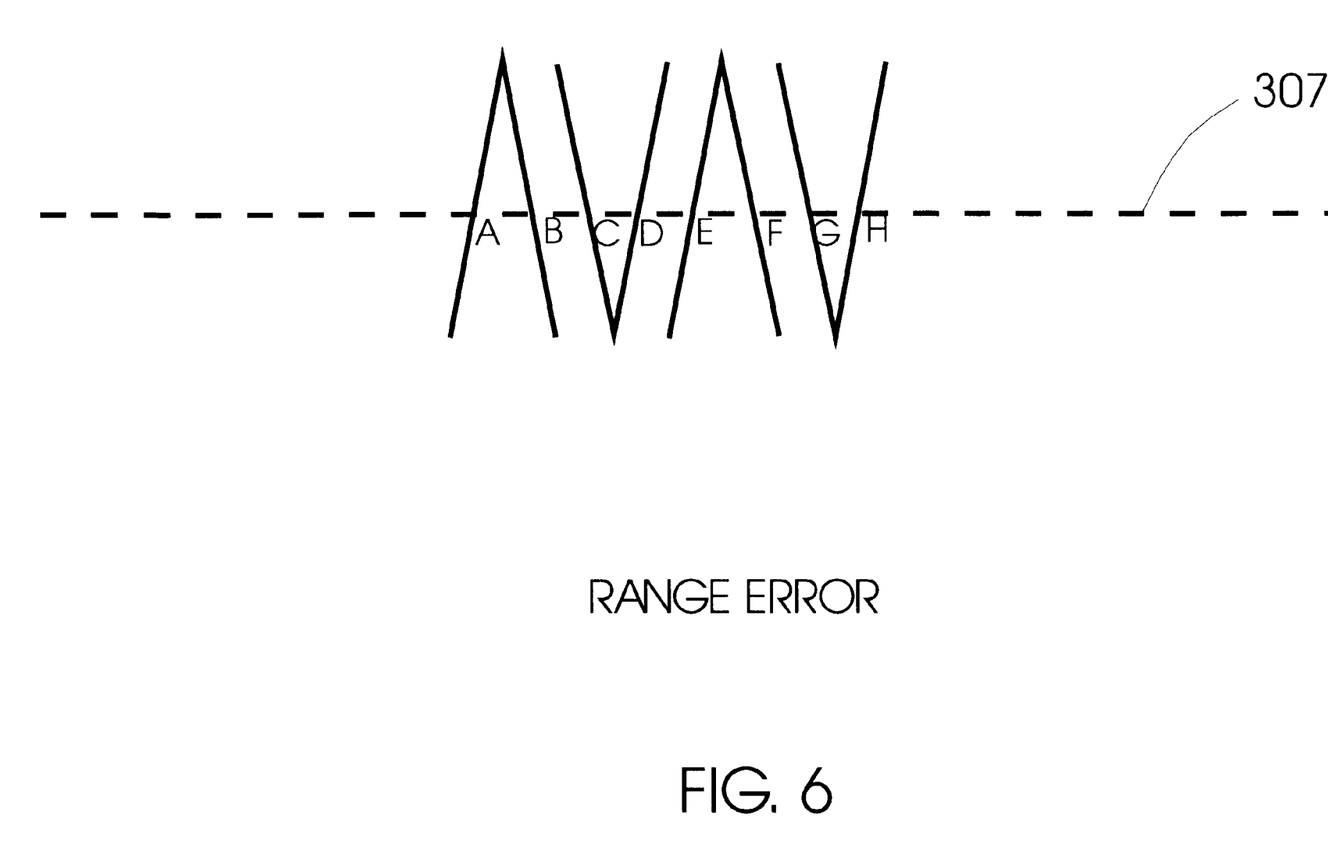
FIG. 6 depicts range error.
Figure 7:
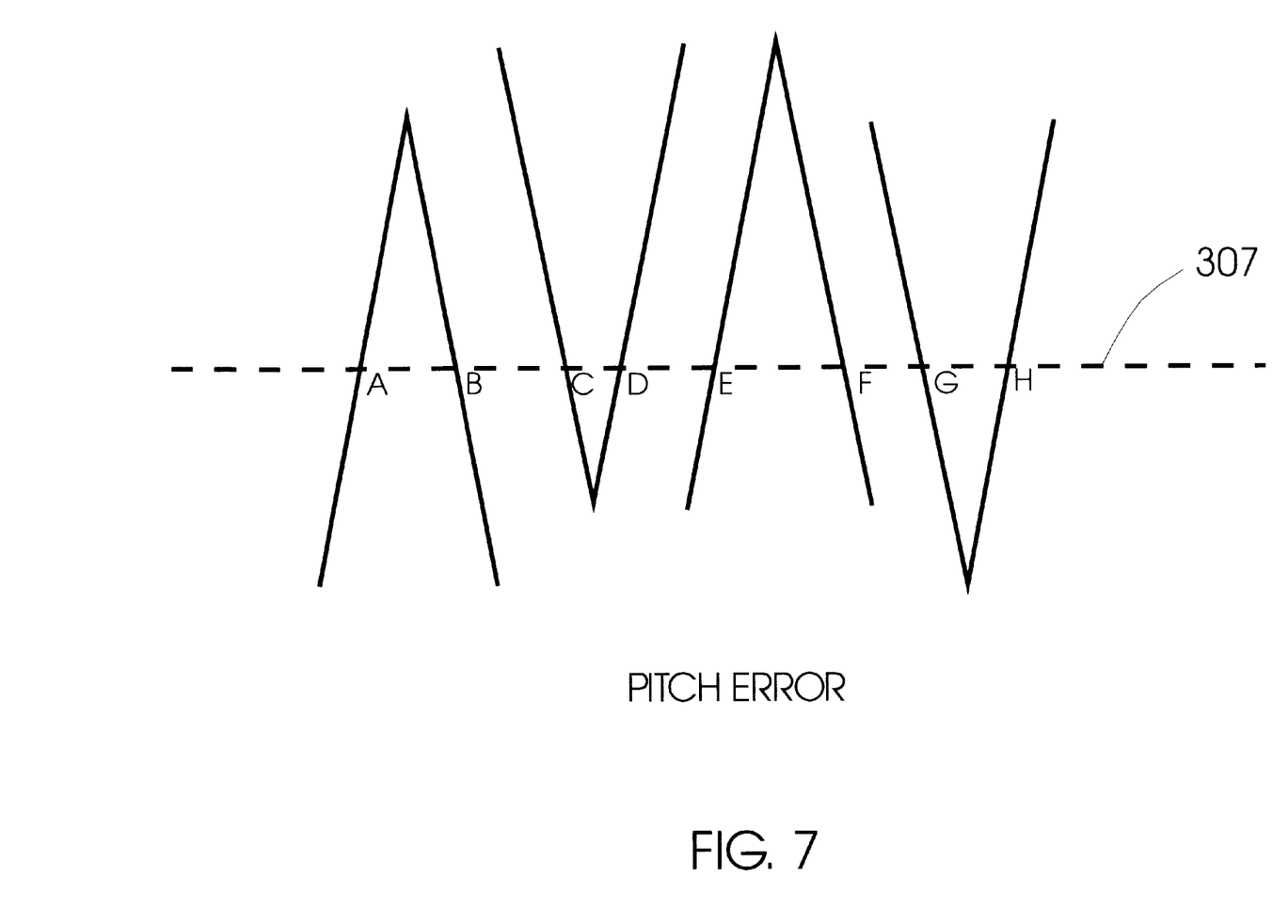
FIG. 7 shows pitch error.
Figure 8:
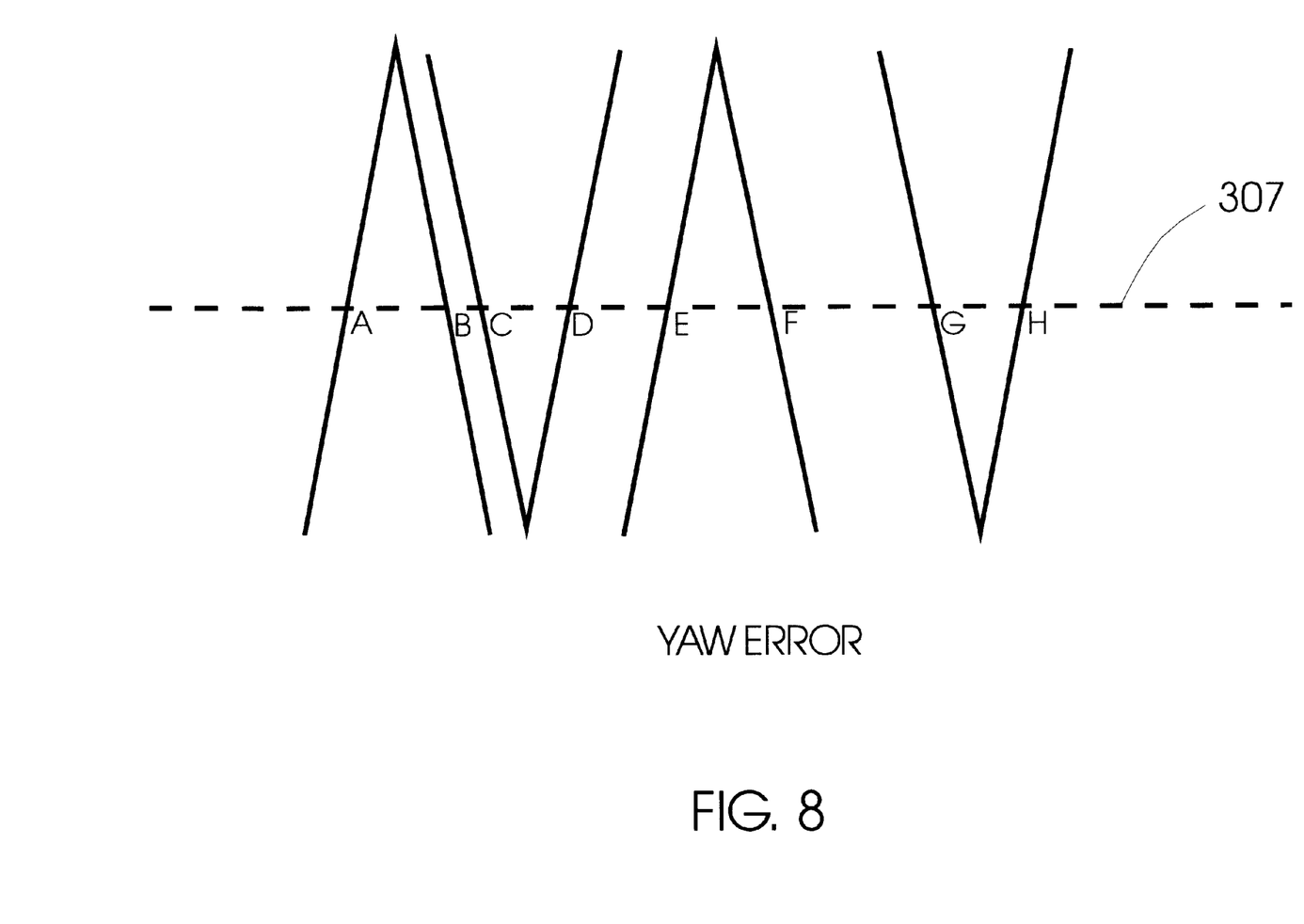
FIGS. 8 and 9 show yaw error and roll error, respectively.
Figure 9:
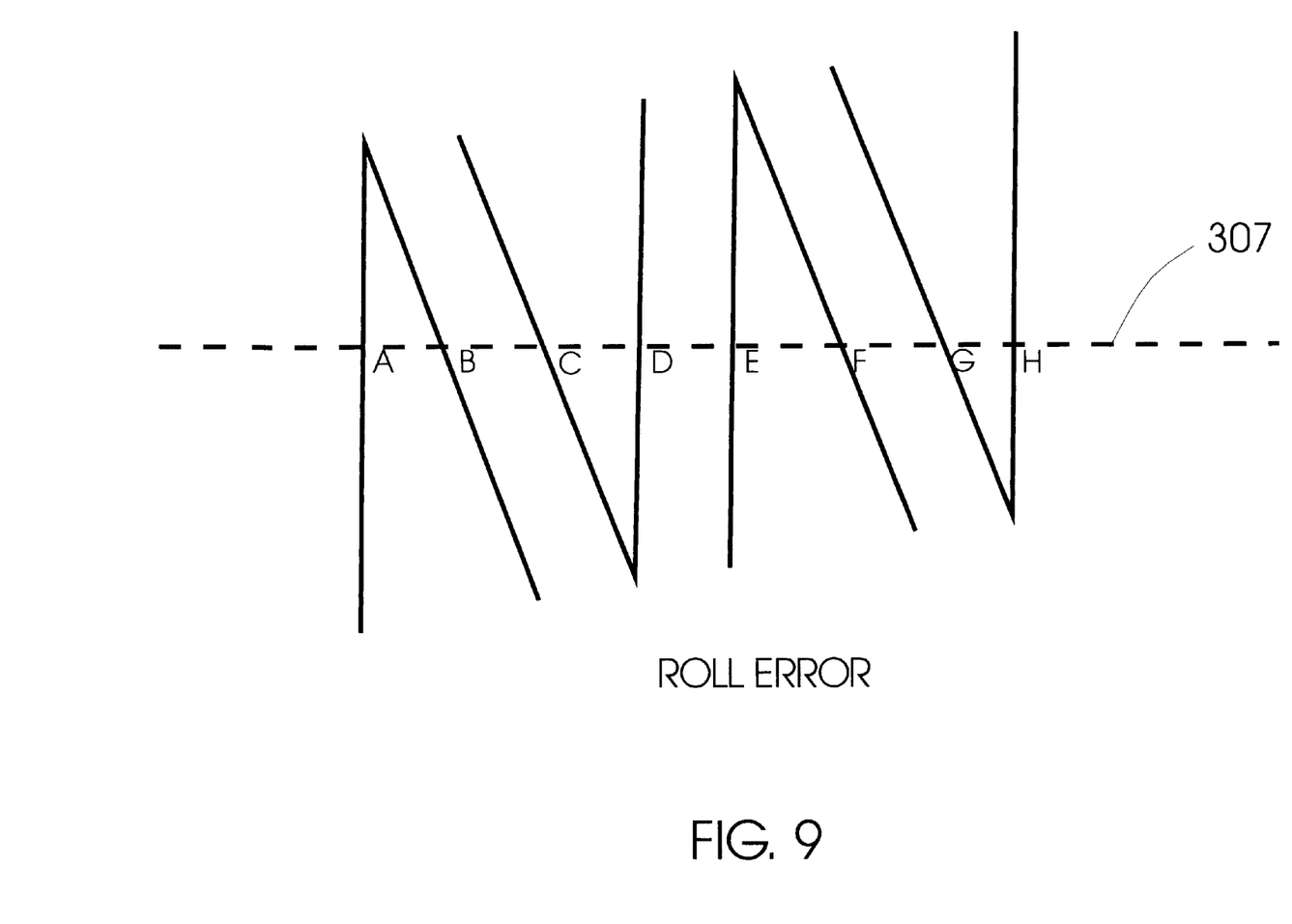

Referring now to the drawing wherein like numbers represent like parts in each of the several figures, FIG. 1 shows optical sensor, comprised of linear detector array 105 and lens 107, immovably affixed to first object 101. Pattern 109 which is comprised of a series of identical v-shaped elements is fixedly mounted onto a surface of second object 103. The angle formed by the two sides of each v-shaped element ranges between 10 degrees and 40 degrees and the desired length of each side of the v-shaped element is dependent on the initial distance between the objects as well as the capability and design of the sensor. It is irrelevant where on the surface of the second object the pattern is located as long as the pattern can be brought to within the field of view of detector array 105. However, it is critical that a few of the elements be raised from the surface plane of the second object while the other elements remain on the surface plane. In the figures, the v-shaped elements are four in number, all linearly aligned with a rightside-up element alternating with an upside-down element and the two inner elements being raised from the surface plane while the two outer elements are on the surface plane of the second object. This is depicted in FIG. 3.

Figure 2:
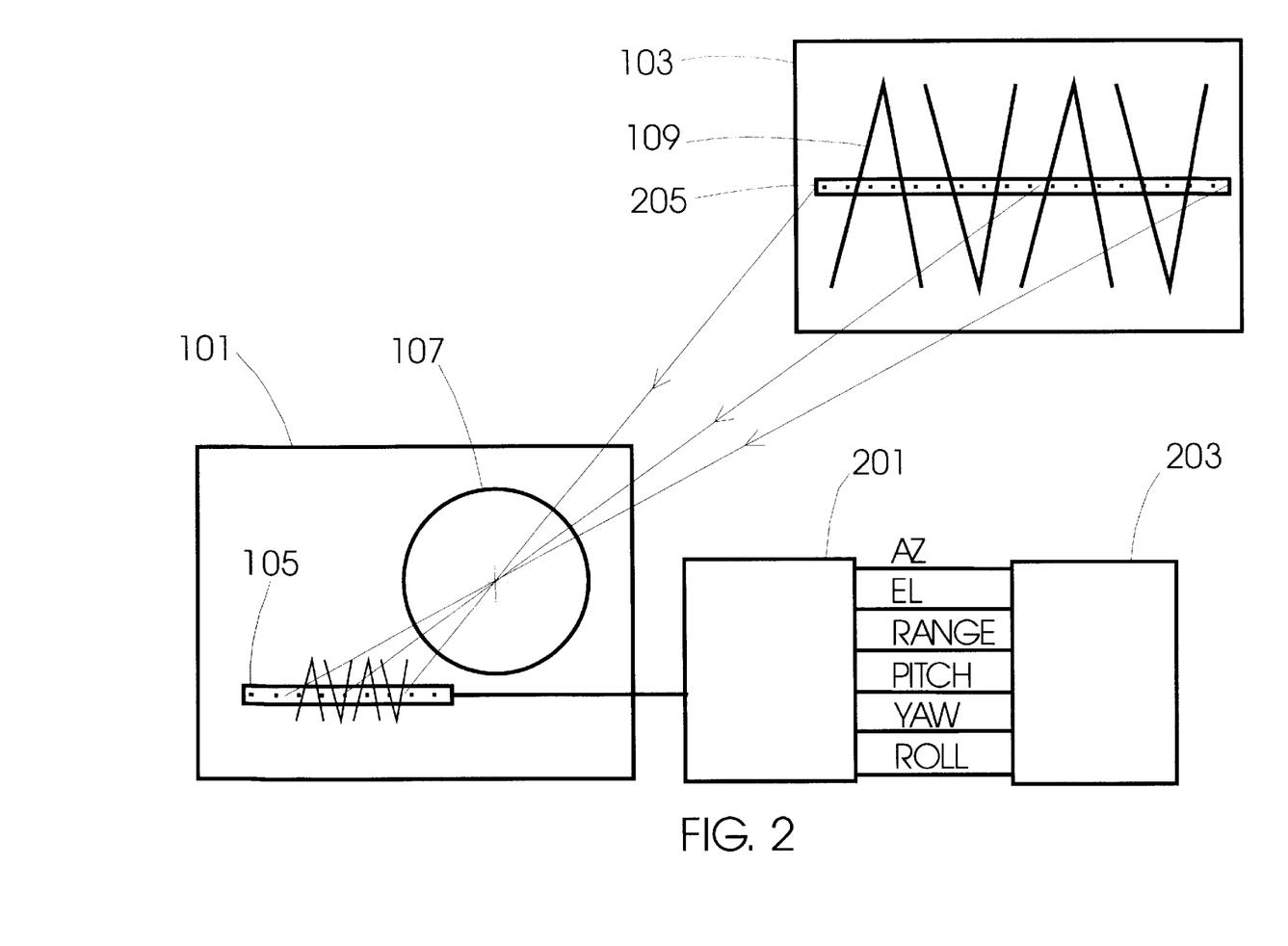
FIG. 2 shows the pre-selected pattern on the second object as viewed by the linear detector array on the first object.

The objective of the invention is to manipulate first object 101 toward the second object until perfect alignment and linkage between the objects is achieved. FIG. 2 details the operation of the invented system. An aperture, such as lens 107, is suitably positioned on the first object in front of the detector array such that rays impinging on the detector array form a narrow fan-like field-of-view. When the two objects are brought into rough alignment, the field-of-view of the sensor forms line 205 across pattern 109 as illustrated in FIG. 2. In subsequent figures, this line is represented by a plurality of dashes 307 which intersects each side of each v-shaped element at a point. These detector-pattern intercepts are labeled "A" through "H", inclusive, from left to right as shown in the figures for purposes of illustrating the algorithms that follow. In rough alignment, the optical contrast between the sides of the v-shaped elements and the background causes a series of signal peaks to appear along the detector array, the location of the peaks on the detector array depending on the relative location and orientation of the two objects. The currently available detector arrays are typically designed to provide a repetitive sequential amplitude signal readout. This signal readout is then input to microprocessor 201 which converts it to a digital format and applies to it a set of simple algorithms to convert the detected peak locations to the six position measurements. These position measurements are displayed on display unit 203 for viewing by a human operator and enable her to manipulate the first object toward the second object so as to obtain pre-determined desired values of the six position measurements.

Referring to FIGS. 4 through 9, it can be seen that each motion of the first object relative to the second object has a unique effect on the relative position of intercepts "A" through "H". There can be greater or lesser complexity in the algorithms to account for perspective effects and crosstalk between the motions, but the simple ones set forth below are sufficient for basic operation. For this description "AB" means the distance between "A" and "B" intercepts on the detector and "AmB" means the mid-point between "A" and "B" intercepts on the detector. Appropriate scaling constants apply to all algorithms and the detector mid-point is defined as "0".

| Motion | Measurement Algorithm | Desired Value |
| --- | --- | --- |
| Range | Distance between "AmB" and "GmH" | The closer the two objects get, the larger the value |
| Azimuth | Location of ("AmB")m("GmH") | 0 meter |
| Motion | Measurement Algorithm relative to the detector mid-point, normalized for range | Desired Value |
| Elevation | "AB" minus "GH", normalized for range | 0 meter |
| Pitch | Ratio of "CD" to "EF" minus the ratio of "GH" to "AB", normalized for range | 0 angle |
| Yaw | ("AmB")m("GmH") minus ("CmD")m("EmF"), normalized for range | 0 angle |
| Roll | "AB" plus "GH" minus the sum of "CD" and "EF", normalized for range | 0 angle |

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. A system for aligning together a first six-DOF object and a second six-DOF object by simultaneously measuring the six degrees of freedom (DOF) of said second object and displaying the six position measurements and manipulating said first six-DOF object relative to said second six-DOF object until the six position measurements reach pre-determined desired values, said system comprising: a pre-selected pattern attached to said second object; a detector array, said array being fixedly mounted on said first object; an aperture suitably positioned to provide said detector array a field of view, said array producing signals that are indicative of the relative locations and orientations of said first and second objects; a computer processor having resident therein pre-selected algorithms, said processor being coupled to said array to receive therefrom said signals and being adapted for, using said resident algorithms, converting said signals to the six position measurements; and a display unit, said display unit being coupled to said processor to receive therefrom said six position measurements and display said measurements for viewing by the operator, thereby enabling the operator to manipulate said first six-DOF object until the six position measurements reach the pre-determined desired values.

2. An aligning system as described in claim 1, wherein said pre-selected pattern comprises a plurality of identical v-shaped elements.

3. An aligning system as described in claim 2, wherein said v-shaped elements are four in number and arranged in a linear fashion, a rightside-up v-shaped element alternating with a upside-down v-shaped element.

4. An aligning system as described in claim 3, wherein the two outer v-shaped elements are on the plane of the surface of said second object and the two inner v-shaped elements are raised from the plane of the surface of said second object.

5. An aligning system as described in claim 4, wherein the angle formed by the two sides of each v-shaped element ranges between 10 degrees and 40 degrees.

6. An aligning system as described in claim 5, wherein said detector array is a linear detector array.

7. An aligning system as described in claim 6, wherein said aperture is a lens.

* * * * *